US008677362B2

(12) United States Patent
Im et al.

(10) Patent No.: US 8,677,362 B2
(45) Date of Patent: Mar. 18, 2014

(54) APPARATUS FOR RECONFIGURING, MAPPING METHOD AND SCHEDULING METHOD IN RECONFIGURABLE MULTI-PROCESSOR SYSTEM

(75) Inventors: Chae-Seok Im, Suwon-si (KR);
Gyu-Sang Choi, Seoul (KR);
Jung-Keun Park, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1474 days.

(21) Appl. No.: 11/980,647

(22) Filed: Oct. 31, 2007

(65) Prior Publication Data
US 2008/0189703 A1  Aug. 7, 2008

(30) Foreign Application Priority Data

Feb. 2, 2007  (KR) .......................... 10-2007-0011262

(51) Int. Cl.
*G06F 9/30* (2006.01)
*G06F 9/40* (2006.01)
*G06F 9/44* (2006.01)

(52) U.S. Cl.
USPC ............................ 718/102; 712/220; 717/100

(58) Field of Classification Search
USPC ............ 718/102; 712/220; 364/200; 717/100
See application file for complete search history.

(56) References Cited

U.S. PATENT DOCUMENTS

| 4,638,427 | A | * | 1/1987 | Martin | ............................. 703/23 |
|---|---|---|---|---|---|
| 5,966,534 | A | | 10/1999 | Cooke et al. | |
| 7,167,971 | B2 | * | 1/2007 | Asaad et al. | ..................... 712/34 |
| 7,571,198 | B2 | * | 8/2009 | Sato et al. | ...................... 708/230 |
| 7,669,035 | B2 | * | 2/2010 | Young et al. | ...................... 712/15 |
| 8,051,255 | B2 | * | 11/2011 | Ferren et al. | ..................... 711/154 |
| 2003/0097508 | A1 | * | 5/2003 | Aneshansley | ................. 710/302 |
| 2004/0049672 | A1 | * | 3/2004 | Nollet et al. | .................. 713/100 |
| 2004/0249880 | A1 | * | 12/2004 | Vorbach | ....................... 709/200 |
| 2005/0013705 | A1 | * | 1/2005 | Farkas et al. | .................. 417/393 |
| 2006/0259743 | A1 | * | 11/2006 | Suzuoki | ........................ 712/220 |
| 2006/0288191 | A1 | * | 12/2006 | Asaad et al. | ..................... 712/34 |
| 2007/0074011 | A1 | * | 3/2007 | Borkar et al. | ................. 712/227 |
| 2007/0113231 | A1 | * | 5/2007 | Honmura | ..................... 718/100 |
| 2007/0283358 | A1 | * | 12/2007 | Kasahara et al. | ............. 718/104 |
| 2008/0102903 | A1 | * | 5/2008 | Schultz et al. | ................ 455/574 |
| 2008/0172398 | A1 | * | 7/2008 | Borkenhagen et al. | ....... 707/100 |

FOREIGN PATENT DOCUMENTS

| EP | 0624842 A2 | 11/1994 |
|---|---|---|
| KR | 10-2004-0069257 | 8/2004 |
| WO | 03/025784 A2 | 3/2003 |

OTHER PUBLICATIONS

Office Action mailed on Jan. 30, 2008 and issued in corresponding Korean Patent Application No. 10-2007-0011262.

(Continued)

*Primary Examiner* — Vincent Tran
(74) *Attorney, Agent, or Firm* — Staas & Halsey LLP (57) ABSTRACT

Provided are an apparatus for reconfiguring a mapping method and a scheduling method in a reconfigurable multi-processor system. A single function is mapped to a reconfigurable processor. When a task is created in the reconfigurable multi-processor system, a function of the task is dynamically mapped to a host processor or a reconfigurable processor, thereby removing temporal sharing between functions on the reconfigurable processor and thus reducing the number of times reconfiguration is performed. The overhead of the reconfigurable processor is minimized and the reconfigurable processor is optimized for a dynamic multi-application environment.

17 Claims, 9 Drawing Sheets

(56) References Cited

OTHER PUBLICATIONS

Scott Hauck, "Configuration Prefetch for Single Context Reconfigurable Coprocessors", ACM/SIGDA International Symposium on Field-Programmable Gate Arrays, 1998.

Rajesh K. Gupta et al. "Hardware-Software Cosynthesis for Digital Systems", IEEE Design and Test of Computers, Sep. 1993, pp. 29-41.

Daniel Mesquita et al. "Remote and Partial Reconfiguration of FPGAs: tools and trends", Proceedings of the International Parallel and Distributed Processing Symposium (IPDPS'03), 2003.

* cited by examiner

APPARATUS FOR RECONFIGURING, MAPPING METHOD AND SCHEDULING METHOD IN RECONFIGURABLE MULTI-PROCESSOR SYSTEM

CROSS-REFERENCE TO RELATED APPLICATIONS

This application claims the benefit of Korean Patent Application No. 10-2007-0011262, filed on Feb. 2, 2007, in the Korean Intellectual Property Office, the disclosure of which is incorporated herein in its entirety by reference.

BACKGROUND

1. Field

One or more embodiments relate to an apparatus for reconfiguring, a mapping method and a scheduling method, and more particularly, to a mapping method and a scheduling method in a reconfigurable multi-processor system.

2. Description of the Related Art

A reconfigurable processor, which hereinafter will be referred to as an RP, can dynamically reconfigure hardware in a manner similar to the reconfiguration of software. In other words, various functions of hardware can be processed when a configuration is changed by a single RP. Since the RP meets requirements of application due to its performance that has advantages of hardware and due to its flexibility that is the advantage of software, it is expected to become widely used.

In general, the RP is a co-processor of a host processor and is used to accelerate the execution of a computationally intensive function.

However, in a multi-task environment where task creation and termination are dynamic, mapping for determining which function is to be executed in the RP and scheduling for executing the mapped function in the RP with minimum overhead are important technical issues for improving performance and usage rate.

Figure 1A:
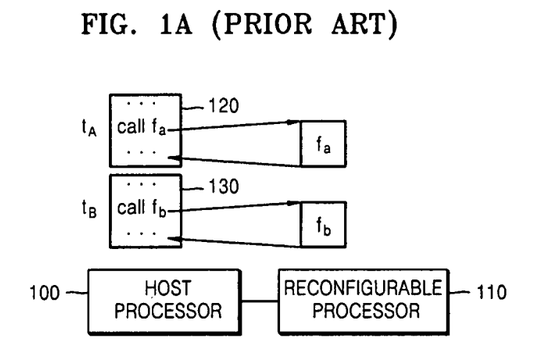
FIGS. 1A and 1B illustrate function mapping and reconfiguration processes according to the prior art.

A conventional mapping technique is a hardware-software sharing technique in which mapping between functions $f_a$ and $f_b$ of application and processors for executing the functions are dynamically determined at the time of the build-up of the application. However, when mapped applications are dynamically executed, various functions $f_a$ and $f_b$ may be mapped to a single reconfigurable processor 110 as illustrated in FIG. 1A.

In order to solve a problem caused by allocation of several functions to a single reconfigurable processor, a partial reconfiguration method "Remote and Partial Reconfiguration of FPGAs: tools and trends" has been disclosed by D. Mesquita et al., in the Proceedings of the International Parallel and Distributed Processing Symposium (IPDPS'03), 2003, and a spatial-temporal sharing method using a multi-context has been suggested. However, such conventional methods do not suggest a fundamental solution due to resource constraints.

As an alternative to the conventional methods, a temporal sharing method has been proposed.

Figure 1B:
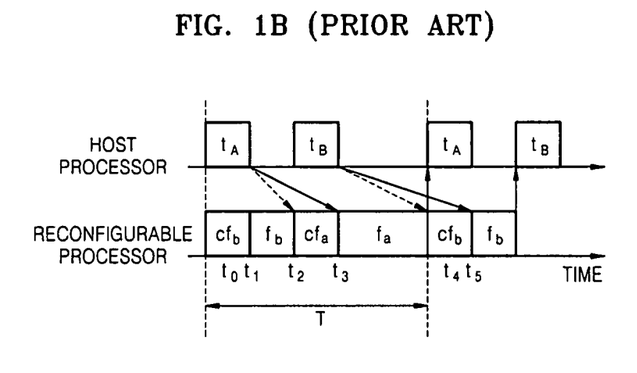

FIG. 1B illustrates an RP using temporal sharing according to the prior art.

Referring to FIGS. 1A and 1B, a function $f_a$ of a task $t_A$ 120 and a function $f_b$ of a task $t_B$ 130 are executed in the reconfigurable processor 110 using a temporal sharing method. In FIG. 1B, a dotted line indicates that a host processor 100 requests the reconfigurable processor 110 to perform reconfiguration to execute a specific function and a solid line indicates the host processor 100 requests the reconfigurable processor 110 to execute the specific function.

First, the task $t_A$ is executed in the host processor 100 at $t_0$. At $t_1$, the task $t_A$ calls the function $f_a$, but it waits because the reconfigurable processor 110 is in the process of executing the function $f_b$. At $t_2$, the reconfigurable processor 110 reconfigures the function $f_a$ into a function $f_{a'}$. At $t_3$, the reconfigurable processor 110 executes the function $f_{a'}$. At $t_4$, the reconfigurable processor 110 provides a result of executing the function $f_a$ to the host processor 100. The task $t_B$ 130 is performed in the same manner as the task $t_A$ 120. Thereafter, the same process is repeated at intervals of T.

However, such a temporal sharing method increase the time and energy consumption required for execution due to the frequent reconfiguration of the reconfigurable processor. This is because execution time and energy consumption are caused by accessing memory when a new configuration bitstream is read and is overwritten to a configuration memory to reconfigure the reconfigurable processor. Referring to FIG. 1B, requests for the execution of the function $f_a$ and the function $f_b$, which are made by the host processor 100 to the reconfigurable processor 110, are delayed by $(t_3-t_2)$ or $(t_5-t_4)$ due to the reconfiguration of the reconfigurable processor 110.

In order to reduce the delay, the configuration bitstream may be pre-fetched. To this end, however, a pre-fetch memory is additionally required, resulting in a failure to reduce energy consumption.

Another problem occurs when an existing function is being executed by the reconfigurable processor at the time of switching to another new function. Referring to FIG. 1B, at $t_1$, the request for reconfiguration with respect to the function $f_a$ is delayed by $(t_2-t_1)$ due to the ongoing execution of the function $f_b$. In order to reduce the delay, preemptive scheduling may be performed. To this end, however, register values used by the reconfigurable processor have to be stored and then reconstructed later and this process consumes much time due to a large number of registers by nature of the reconfigurable processor.

SUMMARY

Additional aspects and/or advantages will be set forth in part in the description which follows and, in part, will be apparent from the description, or may be learned by practice of the invention.

An aspect provides a mapping method and a scheduling method in a reconfigurable processor system, by which temporal sharing between functions in a reconfigurable processor is removed in order to minimize the number of times reconfiguration is performed and mapping of the functions can be changed dynamically during execution of the functions.

According to one aspect, there is provided a block mapping method in a reconfigurable multi-processor system including a host processor that executes at least one function, a reconfigurable processor that reconfigures a portion of the function and executes the function, and a memory. The function mapping method includes mapping one of the at least one function to the reconfigurable processor and, when a task is created in the reconfigurable multi-processor system, dynamically mapping the mapped function and a function of the created task.

According to another aspect, there is provided a system mapping method in a reconfigurable multi-processor system including a host processor that executes at least one function, a reconfigurable processor that reconfigures a portion of the function and executes the function, and a memory. The system mapping method includes initializing a reconfigurable processor (RP) status flag $s_t$ stored in the memory into READY when initializing the reconfigurable multi-processor system and determining whether an event occurs in the reconfigurable multi-processor system and performing scheduling according to the occurring event. The event includes at least one of creation or termination of a task, the completion of configuration performed by the reconfigurable processor, the execution of the function, and the completion of execution performed by the reconfigurable processor.

According to another aspect, there is provided a computer-readable recording medium having recorded thereon a program for implementing the block mapping method and the system mapping method.

BRIEF DESCRIPTION OF THE DRAWINGS

These and/or other aspects and advantages will become apparent and more readily appreciated from the following description of the embodiments, taken in conjunction with the accompanying drawings of which.

DETAILED DESCRIPTION OF THE EMBODIMENTS

Hereinafter, exemplary embodiments will be described in detail with reference to the accompanying drawings. It should be noted that like reference numerals refer to like elements illustrated in one or more of the drawings. In the following description of the embodiments, a detailed description of known functions and configurations incorporated herein will be omitted for conciseness and clarity.

Figure 2A:
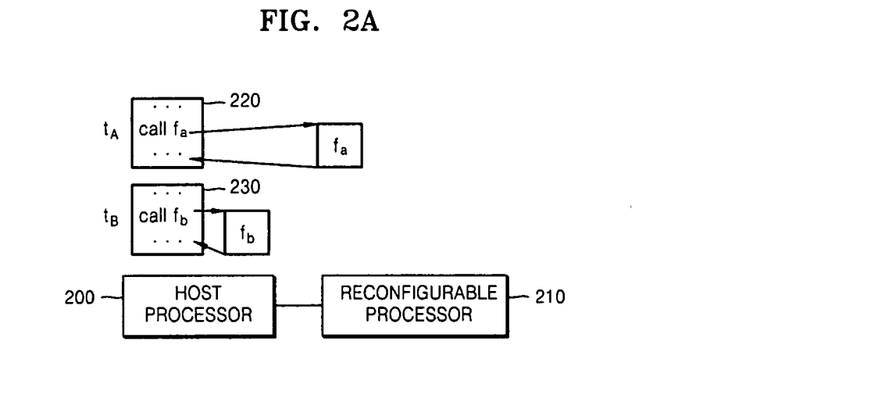
FIGS. 2A and 2B illustrate function mapping and reconfiguration processes according to an exemplary embodiment.
Figure 2B:
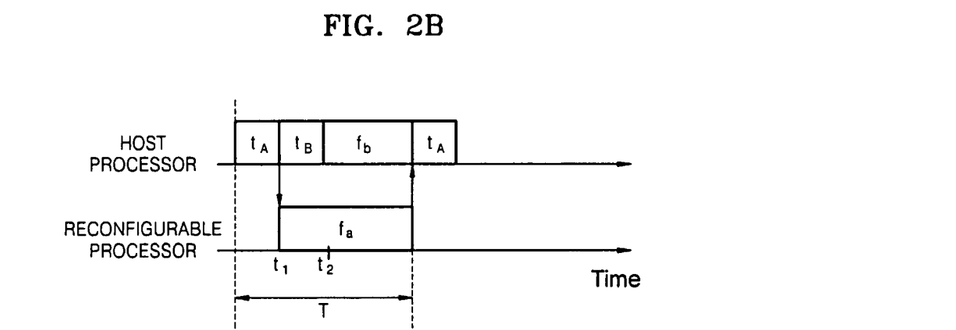

FIGS. 2A and 2B are views for explaining a function mapping process and a reconfiguration process according to an embodiment.

Referring to FIG. 2A, only a function $f_a$ of a task $t_A$ 220 is mapped to a reconfigurable processor 210 and a function $f_b$ of a task $t_B$ 230 is mapped to a host processor 200. In other words, since only a single function is mapped to a single reconfigurable processor, it is not necessary to temporally share the reconfigurable processor, thereby reducing the time and energy consumption required for execution due to frequent reconfiguration.

Unlike in FIG. 1A, since only the function $f_a$ is mapped to the reconfigurable processor 210 and the function $f_b$ is executed by the host processor 220, reconfiguration of the reconfigurable processor 210 does not occur during the execution of the function $f_a$, and thus there is no extra overhead caused.

Referring to FIG. 2B, at $t_1$, once the task $t_A$ 220 calls the function $f_a$, the reconfigurable processor 210 immediately executes the function $f_a$. At $t_2$, once the task $t_B$ 230 calls the function $f_b$, the host processor 220 immediately executes the function $f_b$. Although the execution of the function $f_b$ by the host processor 220 may require more time than the execution of the function $f_b$ by the computational-intensive specialized reconfigurable processor 210, it is of benefit in terms of the time and energy consumption required for execution because the overhead of the reconfigurable processor 210 is reduced. When compared to the case illustrated in FIG. 1B, the time required to execute a function is reduced by $(t_3-t_1)$.

Figure 3A:
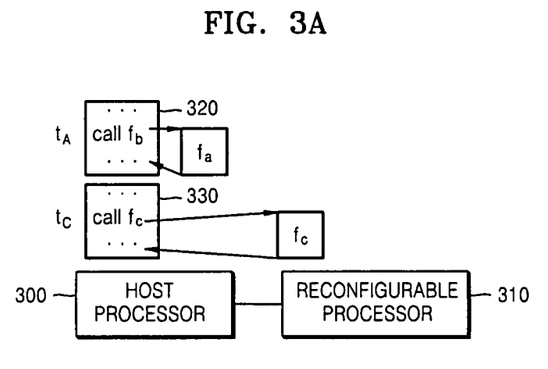
FIGS. 3A and 3B are views for explaining function mapping and reconfiguration processes according to another exemplary embodiment.
Figure 3B:
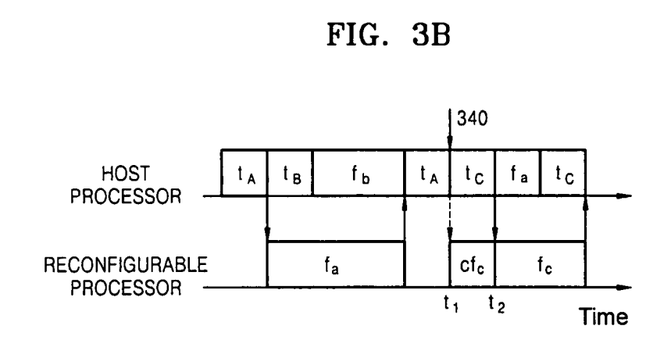

FIGS. 3A and 3B illustrate a function mapping process and a reconfiguration process according to another exemplary embodiment of the present invention.

Referring to FIG. 3A, a function $f_c$ of a task $t_c$ 330 that is newly created is mapped to a reconfigurable processor 310 and a function $f_a$ of an existing task $t_A$ 320 is mapped to a host processor 300, so as to optimally adapt the configuration of the reconfigurable processor 310 to a current task combination in a dynamic multi-task environment where a specific task is created or performed. In other words, mapping is dynamically changed between the host processor 300 and the reconfigurable processor 310.

Such dynamic mapping is performed only in task creation/termination, thereby minimizing the number of times reconfiguration of the reconfigurable processor 310 is performed.

Referring to FIG. 3B, at $t_1$ indicated by 340, a task $t_B$ is terminated and a task $t_c$ is created. At this time, if it is more efficient for the reconfigurable processor 310 to execute a function $f_c$ than the function $f_a$, the host processor 300 requests the reconfigurable processor 310 to reconfigure the function $f_c$ and mapping of the function $f_a$ is changed to the host processor 300 from the reconfigurable processor 310. Once the reconfiguration process has been performed, mapping of the function $f_c$ is changed to the reconfigurable processor 310.

At $t_2$, the reconfigurable processor 310 calls the function $f_c$ if the function $f_c$ is mapped to the reconfigurable processor 310, but the host processor 300 may execute the function $f_c$ without waiting for the completion of reconfiguration of the function $f_c$ if the reconfiguration has not yet been performed and thus the function $f_c$ is mapped to the host processor 300.

Figure 4:
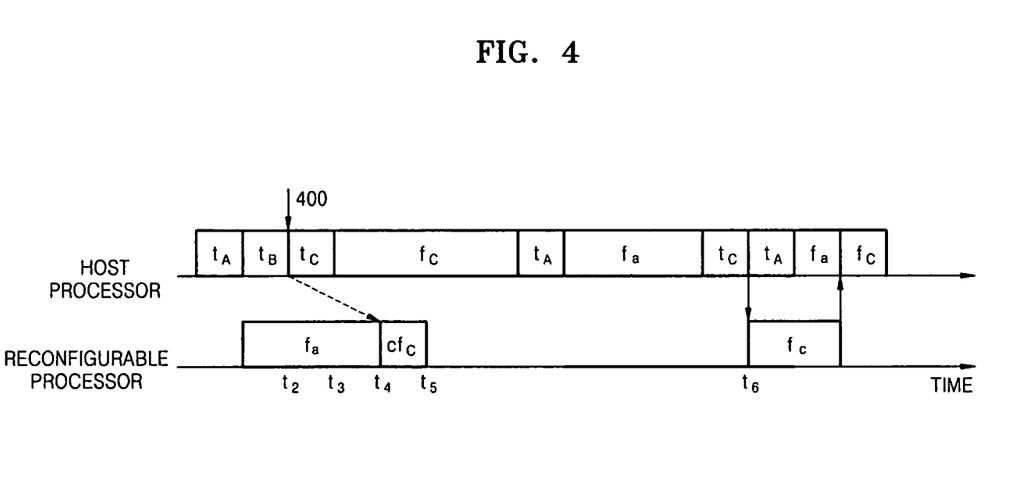
FIG. 4 is a view for explaining a reconfiguration process according to another exemplary embodiment.

FIG. 4 illustrates a reconfiguration process according to another exemplary embodiment.

Referring to FIG. 4, at $t_2$ indicated by 400, a task $t_B$ is terminated and a task $t_c$ is created. At this time, a host processor requests a reconfigurable processor to reconfigure a function $f_c$, but it waits until $t_4$ because the reconfigurable processor is in the process of executing a function $f_a$. At $t_3$, a call for the function $f_c$ is made by the host processor because the reconfigurable processor has not yet performed the reconfiguration of the function $f_c$. Thus, the execution of the function $f_c$ is not delayed until $t_5$. On the other hand, at $t_6$, a call for the function $f_c$ is made by the reconfigurable processor because the reconfigurable processor has performed the reconfiguration of the function $f_c$. In this way, when a request for the reconfigurable processor to perform reconfiguration is delayed due to the execution of an existing function, the delay time can be compensated for.

Figure 5:
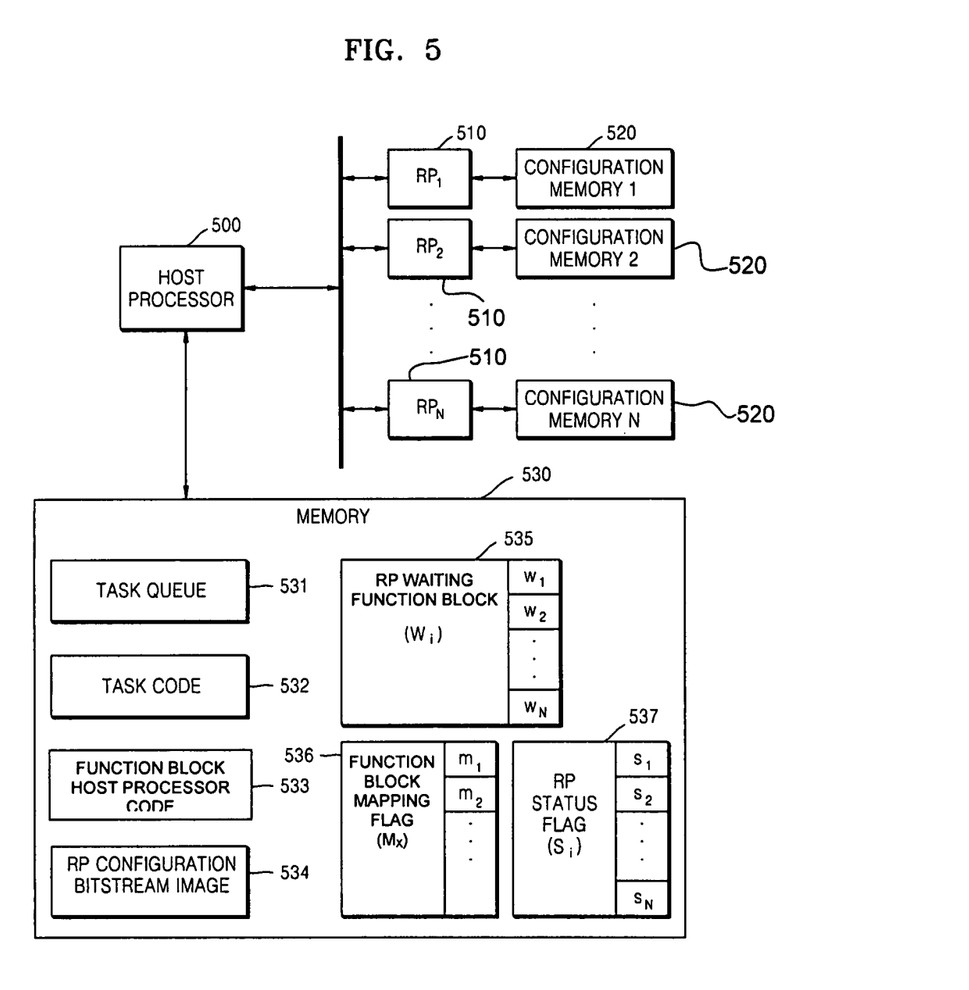
FIG. 5 is a block diagram of a reconfigurable processor system according to an exemplary embodiment.

FIG. 5 illustrates a reconfigurable processor system according to an exemplary embodiment.

Referring to FIG. 5, the reconfigurable processor system includes a host processor 500 that is a main processor, a reconfigurable processor 510 that is a supplementary processor, a configuration memory 526, and a memory 530.

The host processor 500 executes the overall function of application and multi-tasking and may deliver several functions to the reconfigurable processor 510 for performance improvement. The host processor 500 executes function mapping and scheduling according to an exemplary embodiment. Although a single host processor 500 is illustrated in FIG. 5, the reconfigurable processor system may also include a plurality of host processors.

The reconfigurable processor 510 is a microprocessor having erasable hardware that can be dynamically rewired. In other words, the reconfigurable processor 510 is a processor based on reconfigurable logic instead of a conventional central processing unit (CPU). Such a processor effectively interfaces with a programming task required by specific software within a predetermined time period.

The reconfigurable processors 510 may include the configuration memory 520 for storing configuration information. The configuration memory 520 a memory for storing information for system configuration.

In FIG. 5, at least one reconfigurable processor 510 and at least one configuration memory 520 are illustrated.

The reconfigurable processor 510 executes a function allocated by the host processor 500 and delivers the execution result to the host processor 500. In order to configure a specific function in a specific reconfigurable processor 510, the host processor 500 copies an RP configuration bitstream of the function to the configuration memory 520 of the reconfigurable processor 510. Upon completion of the configuration, the host processor 500 requests the reconfigurable processor 510 to execute the function and obtains the execution result whenever the host processor 500 calls the function. The reconfigurable processor 510 responds to requests for configuration and execution with configuration done and execution done.

The memory 530 may store a task queue 531 and a task code 532 for the host processor 500, a function block host processor code 533 and a reconfigurable processor configuration bitstream image 534 for each function, an RP waiting function $W_i$ 535, a function mapping flag $M_x$ 536, and an RP status flag $S_i$ 537.

An exemplary embodiment assumes an environment in which various applications are executed dynamically, each of the applications may be composed of multiple tasks, and a host processor executes the multiple tasks. Each of the tasks may call various functions and a specific function may be dynamically mapped to the host processor 500 or to the reconfigurable processor 510. To this end, the function selectively uses the host processor code 533 and the reconfigurable processor configuration bitstream image 534 for execution.

The RP waiting function $W_i$ 535 may cause a function block for which reconfiguration is requested to wait until the reconfigurable processor 510 completes ongoing execution.

The function mapping flag $M_x$ 536 may store mapping information of a function block from the host processor 500 and has HOST or $RP_i$ according to mapping $RP_i$ denotes $i^{th}$ of RP.

The RP status flag $s_i$ 537 indicates whether the corresponding reconfigurable processor 510 is running or ready.

Figure 6:
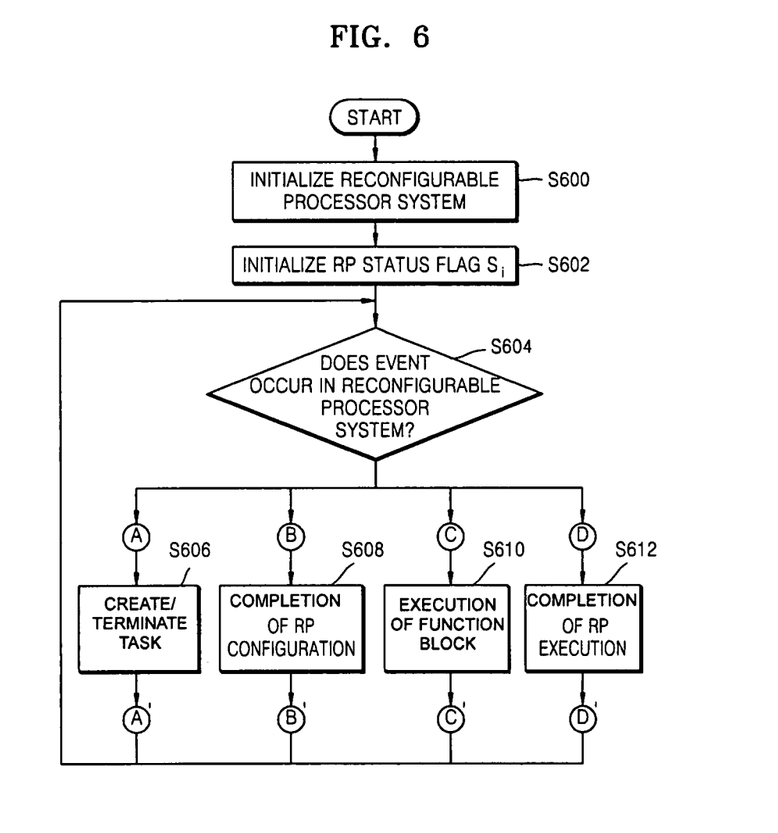
FIG. 6 is a flowchart of a scheduling method in a reconfigurable processor system according to an exemplary embodiment.

FIG. 6 is a flowchart of a scheduling method in a reconfigurable processor system according to an exemplary embodiment.

Hereinafter, a description will be made regarding a scheduling method for optimally adapting the configuration of a reconfigurable processor to a current task combination when a specific task is created or terminated in a dynamic multi-task environment, when the reconfigurable processor has performed configuration, when a function is executed, and when the reconfigurable processor has performed the execution of a function, according to an exemplary embodiment.

Referring to FIG. 6, in operations S600 and S602, a host processor 500 initializes an RP processor status flag $S_i$ 537 to READY during the initialization of a reconfigurable processor system. In operation S604, it is determined whether an event occurs in the reconfigurable processor system. If so, scheduling is performed according to the occurring event. Here, the event includes creation or termination of a task, the completion of configuration by a reconfigurable processor 510, the execution of a function, and the completion of execution by the reconfigurable processor 510.

If an event in which a task is created at a specific point of time occurs in the reconfigurable processor system, scheduling is performed according to task creation in operation S606 and a next event is waited for in operation S604.

Likewise, scheduling is performed in operation S608 if an event, in which the reconfigurable processors 510 have performed configuration, occurs, in operation S610 if an event in which a function is executed occurs, and in operation S612 if an event, in which the reconfigurable processor has performed the execution of a function, occurs, and then a next event is waited for in operation S604.

Hereinafter, scheduling according to different events will be described with reference to FIGS. 7 through 10.

Figure 7:
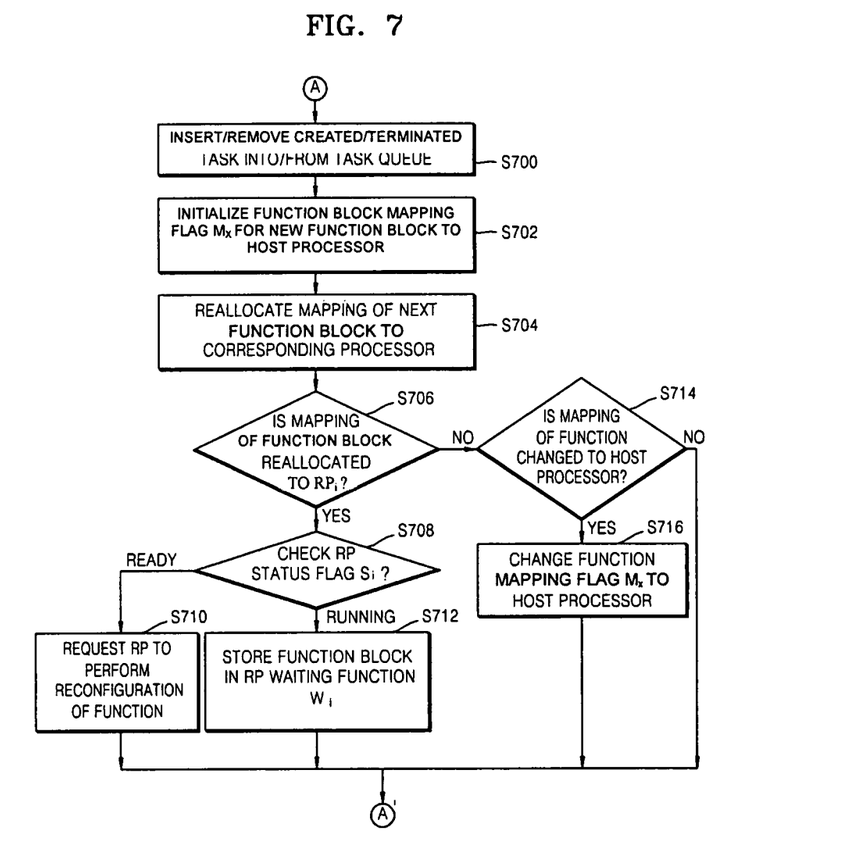
FIG. 7 is a flowchart of a scheduling method in task creation/termination according to an exemplary embodiment.

FIG. 7 is a flowchart of a scheduling method in task creation/termination according to an exemplary embodiment.

In operation S700, if a task is created, the created task is inserted into a task queue of a memory, and if a task is terminated, the terminated task is removed from the task queue.

In operation S702, a function mapping flag $M_x$ for a function of the inserted task is initialized to HOST. In other words, all the functions are initially mapped to a host processor. In operation S704, mapping of next functions is reallocated to corresponding processors that are to execute the functions. Functions that are determined to be executed by reconfigurable processors, e.g., a maximum number of N functions, are selected from among currently used functions and allocated to each of the reconfigurable processors. Therefore, a single function is mapped to a single reconfigurable processor. Here, the selection is made based on the priority of a task including a function, the frequency of the execution of a function, and a gain in the time required for executing a function and a gain in energy consumption when mapping of the function is reallocated from the host processor to the reconfigurable processor.

The mapping result with respect to each function is one of the following three cases. First is a case where the mapping result is not changed. This first case includes a case of HOST→HOST and a case of $RP_i$→$RP_i$. Second is a case where the mapping result is changed from $RP_i$→HOST. Third is a case where the mapping result is changed from HOST→$RP_i$.

In operation S706, it is determined whether mapping of each function is reallocated to the reconfigurable processor. If mapping of the function is reallocated to the reconfigurable processor $RP_i$, a reconfigurable processor status flag $S_i$ is checked in operation S708. If a reconfigurable processor status flag $S_i$ is READY, the reconfigurable processor $RP_i$ is requested to perform reconfiguration with the function in operation S710. If the reconfigurable processor status flag $s_i$ is RUNNING, the function is stored in an RP waiting function $W_i$ in operation S712.

If mapping of the function is not reallocated to the reconfigurable processor $RP_i$ in operation S706, it is determined whether the mapping is reallocated to the host processor in operation S714. If so, a reconfigurable processor mapping flag $M_x$ is changed to HOST in operation S716.

Figure 8:
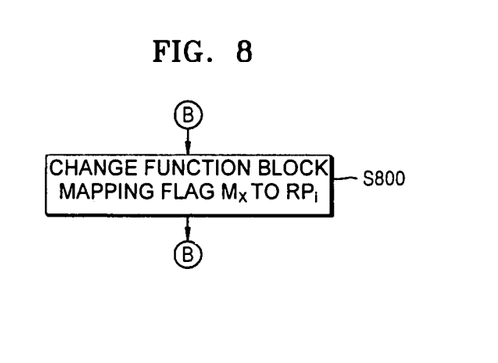
FIG. 8 is a flowchart of a scheduling method at the time of completion of configuration according to an exemplary embodiment.

FIG. 8 is a flowchart of a scheduling method at the time of completion of configuration according to an exemplary embodiment.

Scheduling at the time of completion of configuration is intended to indicate that configuration of a specific function in the reconfigurable processor is completed and thus execution of the function can be performed. When configuration is completed, the function mapping flag $M_x$ stored in the memory is changed to $RP_i$ in operation S800.

As such, since mapping is changed to the reconfigurable processor only after the completion of the configuration in the reconfigurable processor, the delay time caused by execution and configuration by the reconfigurable processor can be reduced without interrupting a real-time feature of application.

Figure 9:
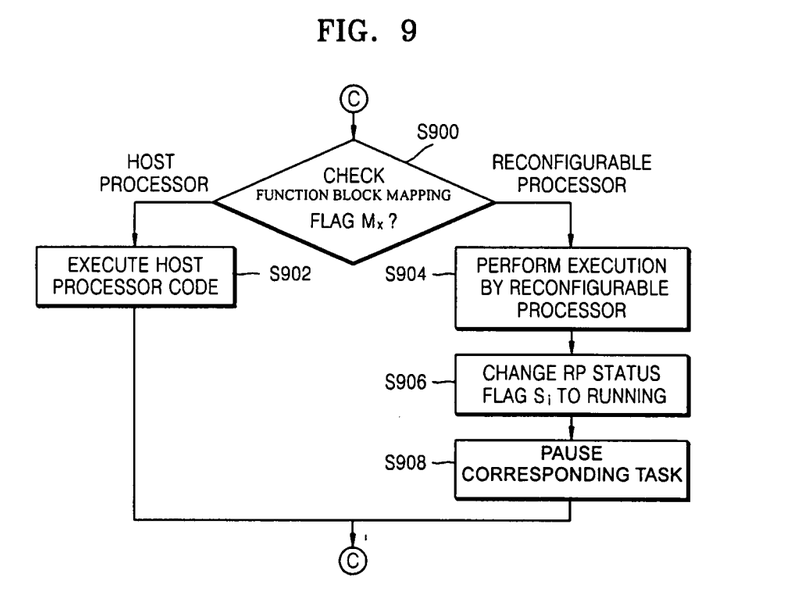
FIG. 9 is a flowchart of a scheduling method in function execution according to an exemplary embodiment.

FIG. 9 is a flowchart of a scheduling method in function execution according to an exemplary embodiment.

If an event in which a function is executed occurs, a function mapping flag $M_x$ is checked in operation S900, in order to determine whether to execute the function by the host processor or by the reconfigurable processor according to mapping of the function. Once the function is mapped to HOST, the host processor executes a host processor code in operation S902. Once the function is mapped to $RP_i$, a corresponding reconfigurable processor is requested to execute the function and the reconfigurable processor executes the function in operation S904. A reconfigurable processor status flag $S_i$ is changed to RUNNING in operation S906 and a task is paused until the execution of the function is completed in operation S908.

Figure 10:
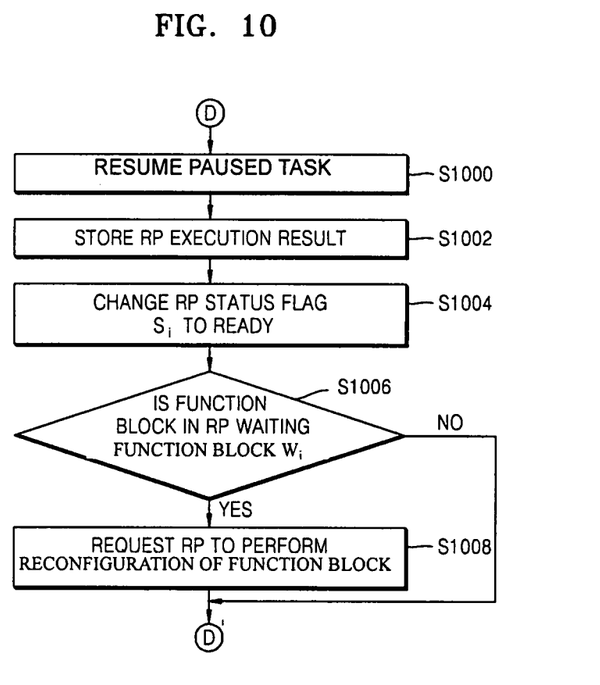
FIG. 10 is a flowchart of a scheduling method at the time of execution according to an exemplary embodiment.

FIG. 10 is a flowchart of a scheduling method in the case of completion of function execution according to an exemplary embodiment.

Once the execution of the function is completed, the paused task is resumed in operation S1000 and the execution result of the reconfigurable processor is stored in operation S1002. In operation S1004, the reconfigurable processor status flag $S_i$ is changed to READY. Next, in operation S1006, it is determined whether there is a waiting function in the RP waiting function $W_i$. If so, the reconfigurable processor $RP_i$ is requested for the reconfiguration of the function in operation S1008.

The present invention can also be embodied as computer-readable code on a computer-readable recording medium. The computer-readable recording medium is any data storage device that can store data which can be thereafter read by a computer system. Examples of computer-readable recording media include read-only memory (ROM), random-access memory (RAM), CD-ROMs, magnetic tapes, floppy disks, optical data storage devices, and carrier waves. The computer-readable recording medium can also be distributed over a network of coupled computer systems so that the computer-readable code is stored and executed in a decentralized fashion.

As described above, according to the present invention, temporal sharing between functions in a reconfigurable processor is removed by mapping a maximum of 1 function to a reconfigurable processor, thereby minimizing overhead of the reconfigurable processor. Moreover, since mapping of a function can be dynamically changed during the execution of the function, the performance and usage rate of a system including the host processor and the reconfigurable processor can be optimized for a dynamic multi-application environment.

In addition, if reconfiguration of the reconfigurable processor has not yet been performed, scheduling is performed in such a way that the host processor immediately executes the function, thereby reducing delay time caused by execution of an existing function performed by the reconfigurable processor and delay time caused by reconfiguration of the reconfigurable processor. Although a few embodiments have been shown and described, it would be appreciated by those skilled in the art that changes may be made in these embodiments without departing from the principles and spirit of the invention, the scope of which is defined in the claims and their equivalents.

What is claimed is:

1. A block mapping method in a reconfigurable multi-processor system including a host processor that executes at least one function, a reconfigurable processor that reconfigures a portion of the function and executes the function, and a memory, the function mapping method comprising:
    mapping the at least one function to the reconfigurable processor in such a manner that only one of the at least one function may be mapped to the reconfigurable processor at each point of time; and
    when a task is created in the reconfigurable multi-processor system, dynamically mapping the mapped function and a function of the created task such that the reconfiguration number of the reconfigurable processor is minimized,
    wherein the host processor requests the reconfigurable processor to reconfigure the function of the created task, the host processor executes the function of the created task, when the reconfigurable processor is in the process of executing the mapped function, and
    wherein the host processor executes an overall function of application and multitasking, and the function mapping.

2. The block mapping method of claim 1, wherein a host processor code and a reconfigurable processor configuration bitstream image for the function are stored in the memory.

3. The block mapping method of claim 1, wherein the mapping comprises performing the dynamical mapping based on at least one of the priority of a task including the function, the frequency of execution of the function, and the time and energy consumption required for executing the function during a reallocation of the mapping.

4. The block mapping method of claim 1, further comprising, when a task is terminated in the reconfigurable multi-processor system, dynamically mapping the mapped function and a function of the terminated task.

5. The block mapping method of claim 1, wherein the mapping comprises dynamically mapping a function of an existing task of the reconfigurable multi-processor system.

6. A system mapping method in a reconfigurable multi-processor system including a host processor that executes at least one function, a reconfigurable processor that reconfigures a portion of the function and executes the function, and a memory, the system mapping method comprising:
    initializing a reconfigurable processor (RP) status flag Sr stored in the memory into READY when initializing the reconfigurable multi-processor system; and
    determining whether an event occurs in the reconfigurable multi-processor system and performing scheduling according to the occurring event,
    wherein the event includes at least one of creation or termination of a task, the completion of configuration performed by the reconfigurable processor, the execution of the function, and the completion of execution performed by the reconfigurable processor, wherein when the event in which a task is created or terminated occurs, the determining comprises; initializing a function mapping flag Mx for a function of the task, which is stored in the memory, to the host processor; and setting mapping for a next function, wherein a single function is mapped to the reconfigurable processor, wherein when the event in which the function is executed occurs, determining comprising checking the function mapping flag Mx, wherein when the checking result indicates that the function mapping flag Mx is set to the host processor, a host processor code for the function, which is stored in the memory, is executed.

7. The system mapping method of claim 6, wherein the mapping to the reconfigurable processor is determined based on at least any one of the priority of a task including a function, the frequency of the execution of the function, and the time and energy consumption required for executing the function during a reallocation of the mapping or the combinations thereof.

8. The system mapping method of claim 6, wherein the determining further comprises determining whether the mapping for the function is changed to the host processor, and the function mapping flag $M_x$ is changed to the host processor when the mapping is changed to the host processor.

9. The system mapping method of claim 8, wherein the determining comprises:

determining whether the mapping for the function is changed to the reconfigurable processor; and checking the RP status flag $S_i$ when the mapping is reallocated to the reconfigurable processor, wherein when the RP status flag $S_i$ is READY, the reconfigurable processor is requested to perform reconfiguration for the function, and when the RP status flag $S_i$ is RUNNING, the function is stored in an RP waiting function $W_i$ stored in the memory.

10. The system mapping method of claim 6, wherein when the event in which the reconfigurable processor has performed configuration occurs, determining comprises reallocating the function mapping flag $M_x$ to the reconfigurable processor.

11. The system mapping method of claim 6, wherein when the checking result indicates that the function mapping flag Mx is set to the reconfigurable processor, a reconfigurable processor configuration bitstream image for the function is extracted from the memory and the function is executed in the reconfigurable processor based on the extracted reconfigurable processor configuration bitstream image.

12. The system mapping method of claim 11, wherein determining comprises changing the RP status flag $S_i$ to RUNNING, and a task including the function is paused until the execution is completed.

13. The system mapping method of claim 6, wherein when the event in which the reconfigurable processor has performed the execution of the function occurs, determining comprises resuming a task up, storing the execution result of the reconfigurable processor, and changing the RP status flag $S_i$ to READY.

14. The system mapping method of claim 13, further comprising checking if there is a function stored in an RP waiting function $W_i$, wherein when there is the stored function, the reconfigurable processor is requested to perform reconfiguration of the stored function.

15. The system mapping method of claim 6, wherein the reconfigurable multi-processor system includes at least one host processor.

16. The system mapping method of claim 6, wherein the reconfigurable multi-processor system includes at least one reconfigurable processor.

17. A non-transitory computer-readable recording medium having recorded thereon a program for implementing a block mapping method in a reconfigurable multi-processor system including a host processor that executes at least one function, a reconfigurable processor that reconfigures a portion of the function and executes the function, and a memory, the function mapping method comprising:

mapping the at least one function to the reconfigurable processor in such a manner that only one of the at least one function may be mapped to the reconfigurable processor at each point of time; and when a task is created in the reconfigurable multi-processor system, dynamically mapping the mapped function and a function of the created task, such that the reconfiguration number of the reconfigurable processor is minimized, wherein the host processor requests the reconfigurable processor to reconfigure the function of the created task, the host processor executes the function of the created task when the reconfigurable processor is in the process of executing the mapped function, and wherein the host processor executes an overall function of application and multitasking, and the function mapping.

* * * * *

UNITED STATES PATENT AND TRADEMARK OFFICE
CERTIFICATE OF CORRECTION

PATENT NO. : 8,677,362 B2
APPLICATION NO. : 11/980647
DATED : March 18, 2014
INVENTOR(S) : Im et al.

Page 1 of 1

It is certified that error appears in the above-identified patent and that said Letters Patent is hereby corrected as shown below:

In the Claims

Column 8, Line 59, In Claim 6, delete "Sr" and insert -- $S_i$ --, therefor.

Signed and Sealed this
First Day of July, 2014

Michelle K. Lee
*Deputy Director of the United States Patent and Trademark Office*